(12) United States Patent
Li et al.

(10) Patent No.: US 10,242,149 B2
(45) Date of Patent: Mar. 26, 2019

(54) ENHANCING INTEGRATED CIRCUIT NOISE PERFORMANCE

(71) Applicant: International Business Machines Corporation, Armonk, NY (US)

(72) Inventors: Xia Li, Singapore (SG); Suo Ming Pu, Shanghai (CN); Xiao Feng Tang, Shanghai (CN); Bo Yu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 602 days.

(21) Appl. No.: 14/967,433

(22) Filed: Dec. 14, 2015

(65) Prior Publication Data

US 2016/0180014 A1   Jun. 23, 2016

(30) Foreign Application Priority Data

Dec. 17, 2014 (CN) .......................... 2014 1 0785608

(51) Int. Cl.
*G06F 17/50* (2006.01)

(52) U.S. Cl.
CPC ...... *G06F 17/5081* (2013.01); *G06F 17/5077* (2013.01); *G06F 2217/82* (2013.01)

(58) Field of Classification Search
CPC ............. G06F 17/5081; G06F 17/5077; G06F 2217/82

(Continued)

(56) References Cited

U.S. PATENT DOCUMENTS 6,028,989 A * 2/2000 Dansky ............... G06F 17/5036
                                                      703/15

6,327,542 B1   12/2001 McBride
(Continued)

FOREIGN PATENT DOCUMENTS

CN   1523662 A     8/2004
CN   101183401 A   5/2008
(Continued)

OTHER PUBLICATIONS

Ren et al., "True Crosstalk Aware Incremental Placement with Noise Map", IEEE/ACM International Conference on Computer Aided Design, ICCAD, 2004, pp. 402-409.

(Continued)

*Primary Examiner* — Jack Chiang
*Assistant Examiner* — Brandon Bowers
(74) *Attorney, Agent, or Firm* — Michael O'Keefe (57) ABSTRACT

A method, system, and computer program product for enhancing integrated circuit noise performance. The method is for arranging target wires in a target region, the method including: for each wire in the target wires, obtaining a signal jump interval with respect to each of the other wires in the target wires, wherein the signal jump interval of one wire with respect to a further wire is a time interval between occurrence of signal jump on the one wire and occurrence of signal jump on the further wire; calculating a corresponding time influence factor based on the signal jump interval, wherein the time influence factor is a decreasing function of the signal jump interval; and arranging the target wires in the target region based on the time influence factor. Coupling noise between wires may be reduced according to the technical solution of an embodiment of the present invention.

18 Claims, 8 Drawing Sheets

(58) Field of Classification Search
USPC .......................................................... 716/115
See application file for complete search history.

(56) References Cited

U.S. PATENT DOCUMENTS

| | | | |
|---|---|---|---|
| 6,507,935 B1 | 1/2003 | Aingaran et al. | |
| 6,536,022 B1 | 3/2003 | Aingaran et al. | |
| 6,601,222 B1* | 7/2003 | Mehrotra | G06F 17/5036 |
| | | | 702/58 |
| 6,615,395 B1 | 9/2003 | Hathaway et al. | |
| 7,043,708 B2* | 5/2006 | Tetelbaum | G06F 17/5022 |
| | | | 716/113 |
| 7,325,217 B2* | 1/2008 | Yoda | G06F 17/5077 |
| | | | 703/2 |
| 7,895,556 B2* | 2/2011 | Kotecha | G06F 17/5045 |
| | | | 716/108 |
| 8,205,181 B1 | 6/2012 | Singla et al. | |
| 8,302,066 B2 | 10/2012 | Kishi | |
| 8,423,940 B2 | 4/2013 | Daellenbach et al. | |
| 8,479,139 B1 | 7/2013 | Baldsdon et al. | |
| 8,701,068 B2 | 4/2014 | McElvain et al. | |
| 8,719,752 B1 | 5/2014 | Ye et al. | |

FOREIGN PATENT DOCUMENTS

| | | |
|---|---|---|
| CN | 101802783 A | 8/2010 |
| CN | 103177145 A | 6/2013 |
| CN | 103914583 A | 7/2014 |

OTHER PUBLICATIONS

Pending CN Application No. 201410785608.X, filed on Dec. 17, 2014, entitled: "Method and Apparatus for Enhancing Integrated Circuit Noise Performance", 27 pages.

Ya et al., "A Class of IC Wiring Algorithm Based on Graph Theory Model", Computer Engineering and Applications, Issue Date: Aug. 19, 2014, Abstract Only, 1 page.

* cited by examiner

ENHANCING INTEGRATED CIRCUIT NOISE PERFORMANCE

BACKGROUND

The present invention relates to the technology of integrated circuit design, and more specifically, relates to a method and apparatus for enhancing integrated circuit noise performance.

The development of integrated circuit manufacturing process results in an increasingly high chip density, while coupling noise between wires also becomes increasingly significant. The coupling noise will generate a coupling delta delay in wires, thereby causing damage to signal time sequence.

Generally, the longer the common portion between two parallel wires, the more significant the coupling noise is between the two wires. It would be easily understood that when the lengths of two wires are relatively long, their common portion is also usually long. The coupling noise between wires is also related to the distance between wires. The larger the distance is, the smaller the coupling noise is. During wiring, a size of a target region and a number of wires that need to be arranged or routed in that target region is usually fixed. Typically, the channels or tracks available for arranging wires in the target region are also fixed. One proposed solution to reduce coupling noise may include arranging two long wires on channels spaced as far apart as possible. For example, short wires are inserted between two long wires, or blank channels are inserted between long wires.

In a target region, a number of wires that need to be arranged might be approximate to a number of channels in the target region. Therefore, it may not be possible to insert short wires or blank channels between long wires in a particular target region due to a lack of available channels.

SUMMARY

Embodiments of the present invention provide a method and apparatus for enhancing integrated circuit noise performance.

A method for enhancing integrated circuit noise performance according to an embodiment of the present invention is for arranging target wires in a target region, the method including: for each wire in the target wires, obtaining its signal jump interval with respect to each of the other wires in the target wires, wherein the signal jump interval of one wire with respect to a further wire is a time interval between occurrence of signal jump on the one wire and occurrence of signal jump on the further wire; calculating a corresponding time influence factor based on the signal jump interval, wherein the time influence factor is a decreasing function of the signal jump interval; and arranging the target wires in the target region based on the time influence factor.

An apparatus for enhancing integrated circuit noise performance according to an embodiment of the present invention is for arranging target wires in a target region, the apparatus including: a signal jump interval obtaining module configured to, for each wire in target wires, obtain its signal jump interval with respect to each of the other wires in the target wires, wherein the signal jump interval of one wire with respect to a further wire is a time interval between occurrence of signal jump on the one wire and occurrence of signal jump on the further wire; a time influence factor determining module configured to calculate a corresponding time influence factor based on the signal jump interval, wherein the time influence factor is a decreasing function of the signal jump interval; and an arranging module configured to arrange the target wires in the target region based on the time influence factor.

By virtue of the solution according to an embodiment of the present invention, the noise performance of the integrated circuit may be enhanced.

BRIEF DESCRIPTION OF THE DRAWINGS

Through the more detailed description of an embodiment of the present disclosure in the accompanying drawings, the above and other objects, features and advantages of the present disclosure will become more apparent, wherein in the an exemplary embodiment of the present disclosure, same reference numerals generally represent same components.

Elements of the figures are not necessarily to scale and are not intended to portray specific parameters of the invention. For clarity and ease of illustration, scale of elements may be exaggerated. The detailed description should be consulted for accurate dimensions. The drawings are intended to depict only typical embodiments of the invention, and therefore should not be considered as limiting the scope of the invention. In the drawings, like numbering represents like elements.

DETAILED DESCRIPTION

Some preferable embodiments will be described in more detail with reference to the accompanying drawings, where a preferable embodiment of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
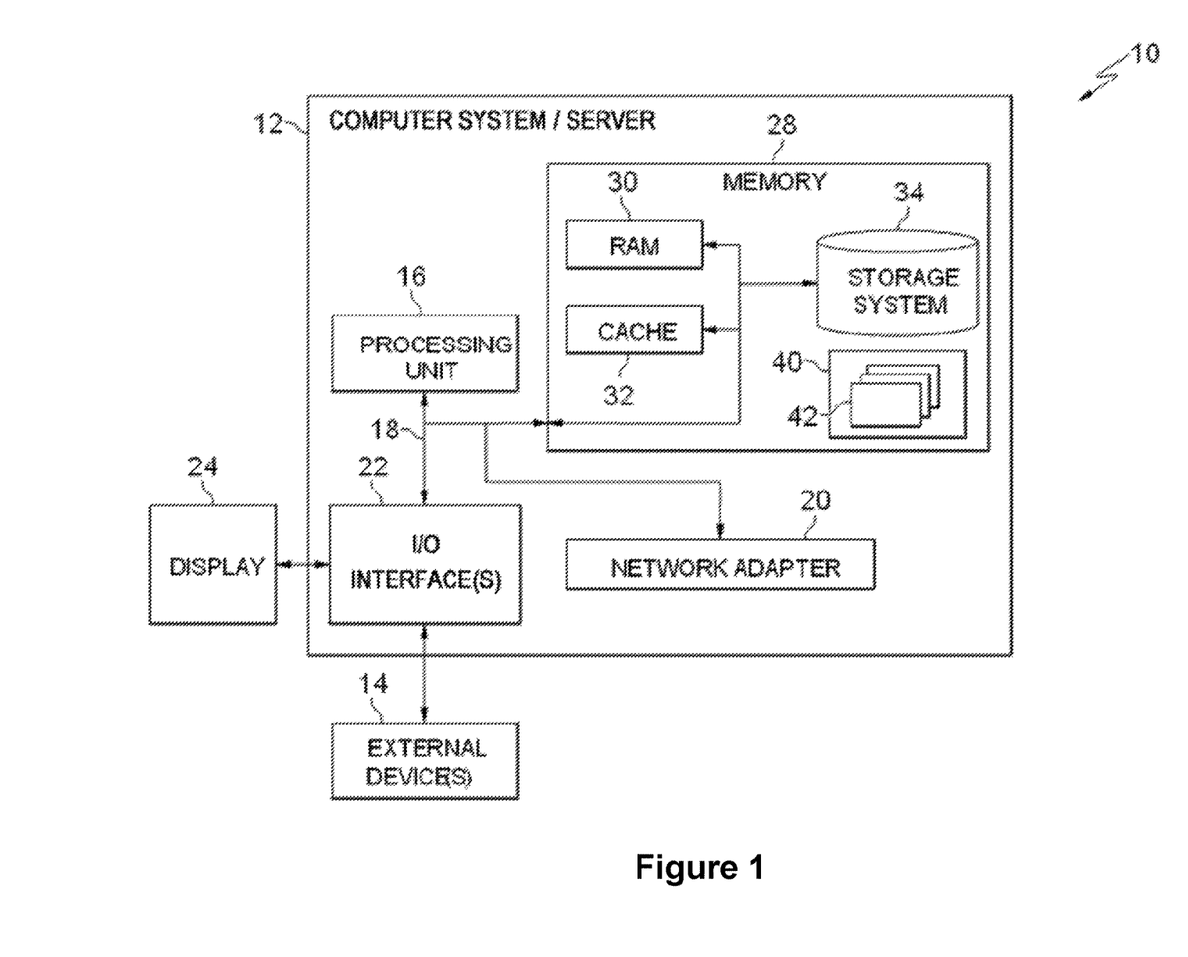
FIG. 1 shows a block diagram of an exemplary computer system/server 12 which is applicable to implement an embodiment of the present invention.

Referring now to FIG. 1, where an exemplary computer system/server 12 which is applicable to implement an embodiment of the present invention is shown. Computer system/server 12 is only illustrative and is not intended to suggest any limitation as to the scope of use or functionality of an embodiment of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product 40 having a set (e.g., at least one) of program modules 42 that are configured to carry out the functions of an embodiment of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Hereinafter, a method for enhancing integrated circuit noise performance according to an embodiment of the present invention will be described with reference to FIGS. 2-7.

Figure 2:
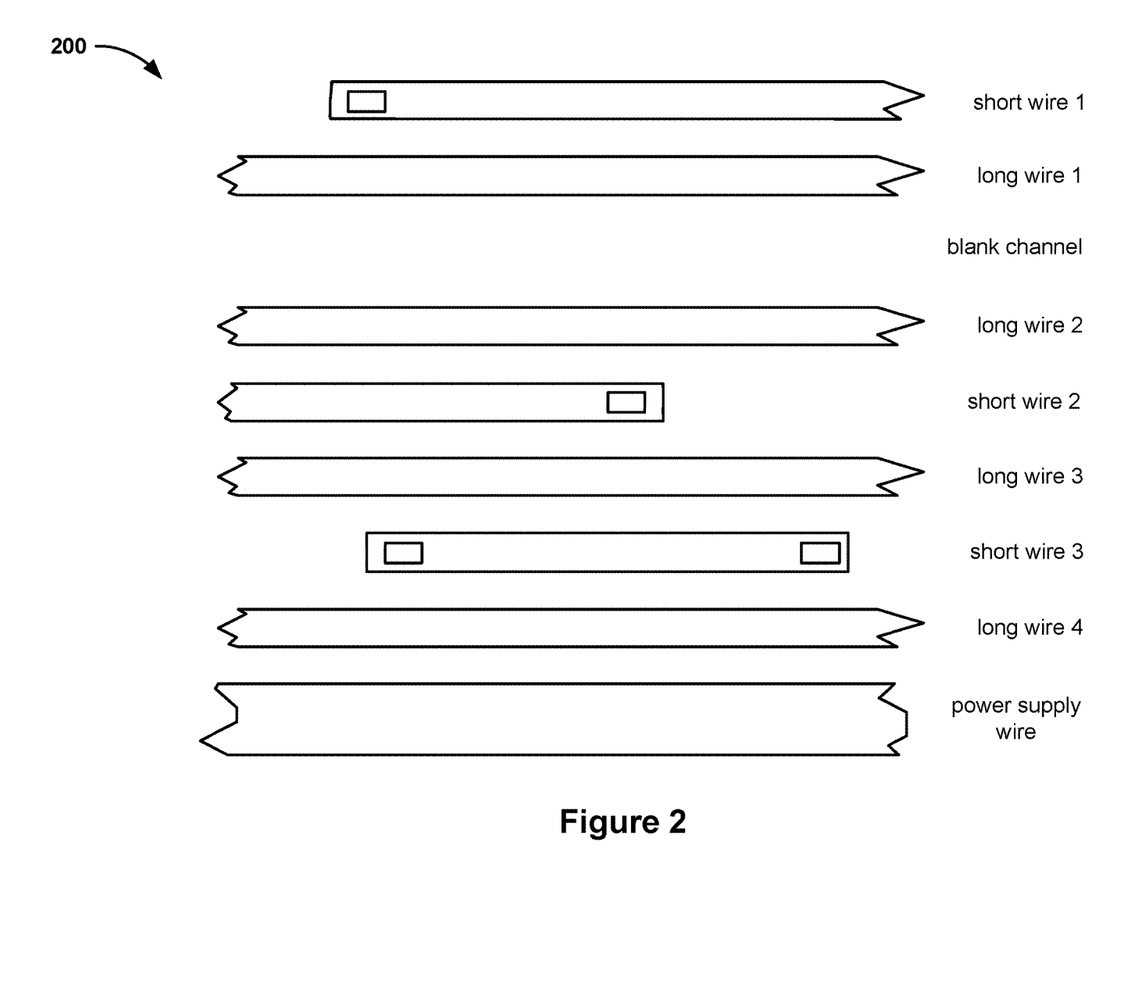
FIG. 2 shows an exemplary wire arrangement according to an embodiment of the present invention.

Referring now to FIG. 2, an exemplary wire layout 200 of an integrated circuit is shown. In general, the wires may be divided into power supply lines and signal lines, wherein the power supply lines include power source lines and ground lines, while the signal lines include screened signal lines and unscreened lines. The power source lines and ground lines do not transmit signals; therefore, it may be assumed that they may not generate coupling noise to other wires and may not be influenced by coupling noise generated by other wires. Screened signal lines means both sides of the signal lines have been screened; therefore, it may be assumed that the signal lines will not generate coupling noise to other wires and will not be influenced by coupling noise generated by other wires. Generally, a clock signal line is a screened signal line. The power supply line and the screened signal line may be generally called wires without a coupling effect. The wires without a coupling effect likely also include other types of wires, as long as such wires may be assumed not to generate coupling noise to other wires and not to be affected by coupling noise generated by other wires.

As shown in FIG. 2, a short wire 2 is inserted between a long wire 2 and a long wire 3, and a short wire 3 is between the long wire 3 and a long wire 4, while a blank channel is inserted between a long wire 1 and the long wire 2. FIG. 2 also shows a short wire 1 adjacent to the long wire 1 and a power supply wire adjacent to the long wire 4. When regional division in an integrated circuit is small enough, all wires in the region are parallel to one another. In the description below, the assumption is made that all wires are parallel to one another, i.e., only the wires in a small enough region are adjusted.

Figure 3:
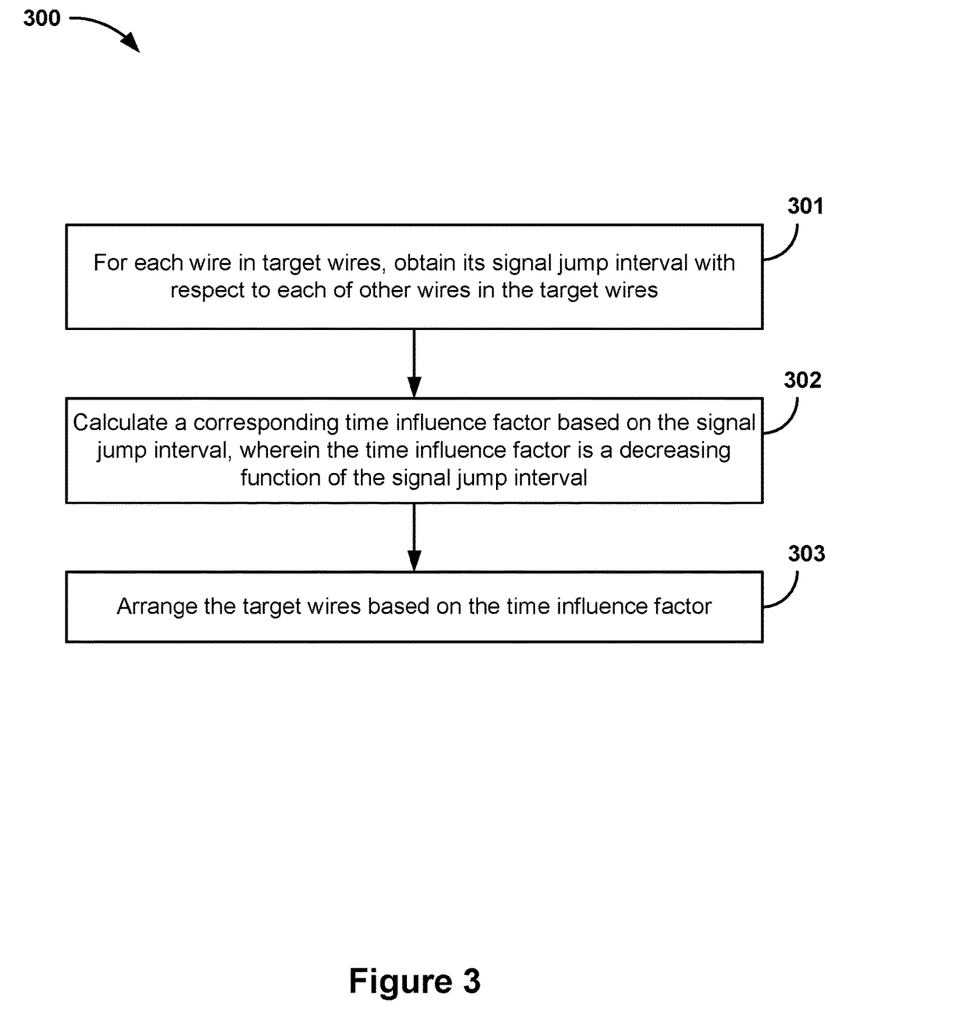
FIG. 3 shows a flow diagram of a method for enhancing integrated circuit noise performance according to an embodiment of the present invention.

Referring now to FIG. 3, a method 300 is shown. First, obtain a signal jump interval between each wire in a set of target wires, at step 301. The signal jump interval of one wire with respect to another wire is equal to a time interval between a signal jump occurring on one wire and a signal jump occurring on the other wire.

The target wires refer to wires that need to be arranged in a specified target region. As mentioned above, the coupling noise is only generated between unscreened signal lines; therefore, it is first assumed that all of the target wires are unscreened signal lines.

The coupling noise between two wires is generated due to existence of parasitic capacitance between the two wires. When a signal transmitted on one wire changes, it will incur charging and discharging of the parasitic capacitance, thereby affecting the other wire and causing signal distortion on the other wire. Hereinafter, a wire incurring coupling noise is called a transmission wire, and a wire suffering the coupling noise is called a reception wire.

A signal on a wire is known. Therefore, the time interval between occurrence of signal jump on the transmission wire and occurrence of signal jump on the reception wire would be easily derived. Due to the complexity of signals, for different signal jump on the transmission wire, their corresponding time intervals are likely different. For example, for a first signal jump on the transmission wire, 10 picoseconds later, a first signal jump will occur on the reception wire; for a second signal jump on the transmission wire, 20 picoseconds later, a second signal jump will occur on the reception wire. According to an embodiment of the present invention, a minimum value in possible time intervals is used as the signal jump interval of the transmission wire with respect to the reception wire.

Because signal change occurring on the transmission wire can influence the signal transmitted later on the reception wire, when the time interval between signal jump of the transmission wire and signal jump of the reception wire is discussed, it refers to the scenario in which signal jump occurs first on the transmission wire and then signal jump occurs on the reception line.

For two wires, the transmission wire and the reception wire can be switched. Suppose wire A has twice signal jump at time t1 and time t2 respectively, and wire B has twice signal jump at time t3 and time t4 respectively and the sequence in increasing time order of the four times is t1, t3, t2, t4. At t1, the wire A is a transmission wire, while wire B is a reception wire. The time interval between the signal jump on the transmission wire and the signal jump on the reception wire is t3-t1. At t3, the wire B is a transmission wire, and the wire A is a reception wire, then the time interval between the signal jump on the transmission wire and the signal jump of the reception wire is t2-t3. At t2, the wire A is a transmission wire, and the wire B is a reception wire; then the time interval between the signal jump on the transmission wire and the signal jump on the reception wire is t4-t2. So on and so forth.

Further, suppose the time interval t3-t1 is greater than the time interval t4-t2, then the signal jump interval of wire A with respect to wire B is t4-t2. In turn, the signal jump interval of wire B with respect to wire A is t2-t3.

Next, calculate a corresponding time influence factor based on the signal jump interval, at step 302. The time influence factor is a decreasing function of the signal jump interval.

When the signal on the transmission wire jumps, for example, changing from a low level to a high level or changing from a high level to a low level, the generated coupling noise is particularly significant. If the signal on the reception wire also jumps later, then the later jump will be delayed, which is called incremental delay. In other words, the transmission wire has a time influence on the reception wire.

The coupling noise caused by signal jump on the transmission wire will fade gradually with time. In other words, if the time interval between the time of signal jump on the transmission wire and the time of signal jump on the reception wire is greater than a certain time interval threshold, then the incremental delay caused by the signal jump on the transmission wire to the signal jump on the reception wire may be small enough to be accepted. In this case, it may be believed that the transmission wire will not cause incremental delay to the reception wire; then the time influence factor of the transmission wire with respect to the reception wire is the minimum value. In other words, the larger the time interval is, the smaller the time influence factor is.

Next, the target wires are arranged based on the time influence factor, at step 303.

As mentioned above, the longer the distance between two wires is, the smaller the coupling noise is. Therefore, the principle of arranging the target wires based on the time influence factor is that two wires with a larger time influence factor should be spaced as far as possible. It would be appreciated that for any two wires, there are two time influence factors. According to an embodiment of the present invention, a larger value in the two time influence factors may act as the time influence factor between the two wires; also, a sum of the two time influence factors may also act as the time influence factor between the two wires. After the time influence factor is derived between every two wires, the above principle may be implemented with various algorithms.

Hereinafter, a specific method of arranging the target wires based on the time influence factor according to an embodiment of the present invention will be described with reference to FIG. 4.

Figure 4:
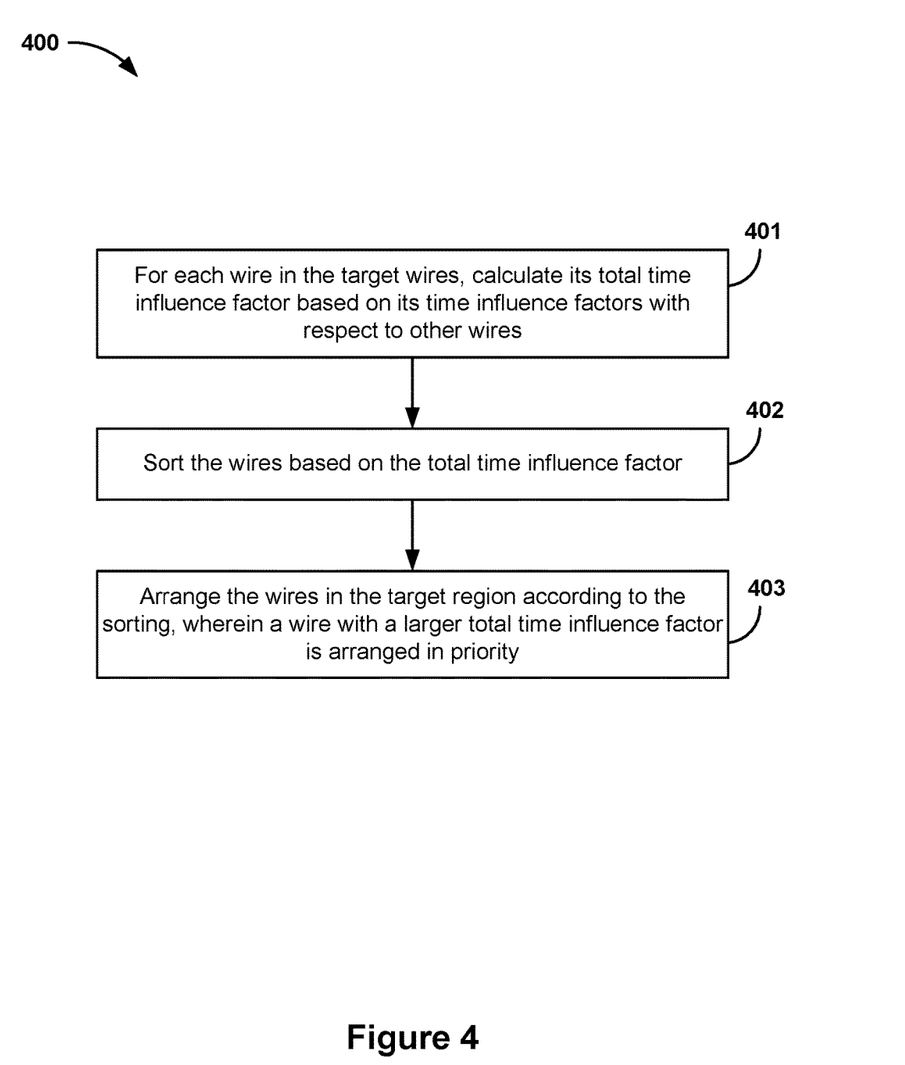
FIG. 4 shows a flow diagram of a method for enhancing integrated circuit noise performance according to an embodiment of the present invention.

Referring now to FIG. 4, a method 400 is shown. First, for each wire in the target wires, its total time influence factor is calculated based on its time influence factor with respect to other wires, at step 401.

It is seen from the above description that for any wire, it has a time influence factor with respect to any of the other wires. According to an embodiment of the present invention, the sum of these time influence factors may act as the total time influence factor of the wire.

Next, the wires are sorted based on the total time influence factor, at step 402. A wire with a larger total time influence factor means its stronger capability of causing incremental delay to other wires.

Next, the wires are arranged in a target region according to the sorting sequence, where a wire with a larger total time influence factor is arranged in priority, at step 403.

An advantage of such practice is that a wire with a larger total time influence factor has a greater opportunity to be spaced a longer distance from another wire with a larger total time influence factor.

In the above description, it may be assumed that all target wires are unscreened wires. During the actual wiring process, not only the unscreened wires but also the wires without a coupling effect should be arranged in the target region. The wires without a coupling effect include screened wires, power source lines and ground lines, wherein the screened wires are generally clock lines. Generally, the wires without a coupling effect are arranged in the target region prior to the unscreened wires.

As mentioned above, the wires without a coupling effect may not generate coupling noise to other wires and also may not suffer influence from the coupling noise generated by other wires. According to an embodiment of the present invention, the wire with a larger total time influence factor may be arranged in priority on a channel adjacent to the wires without a coupling effect. This practice has an advantage that the wire with a larger total time influence factor may generate coupling noise on the wire arranged on only one side of the wire.

Hereinafter, the method of arranging wires without a coupling effect according to an embodiment of the present invention will be described with reference to FIG. 5A and FIG. 5B.

Figure 5A:
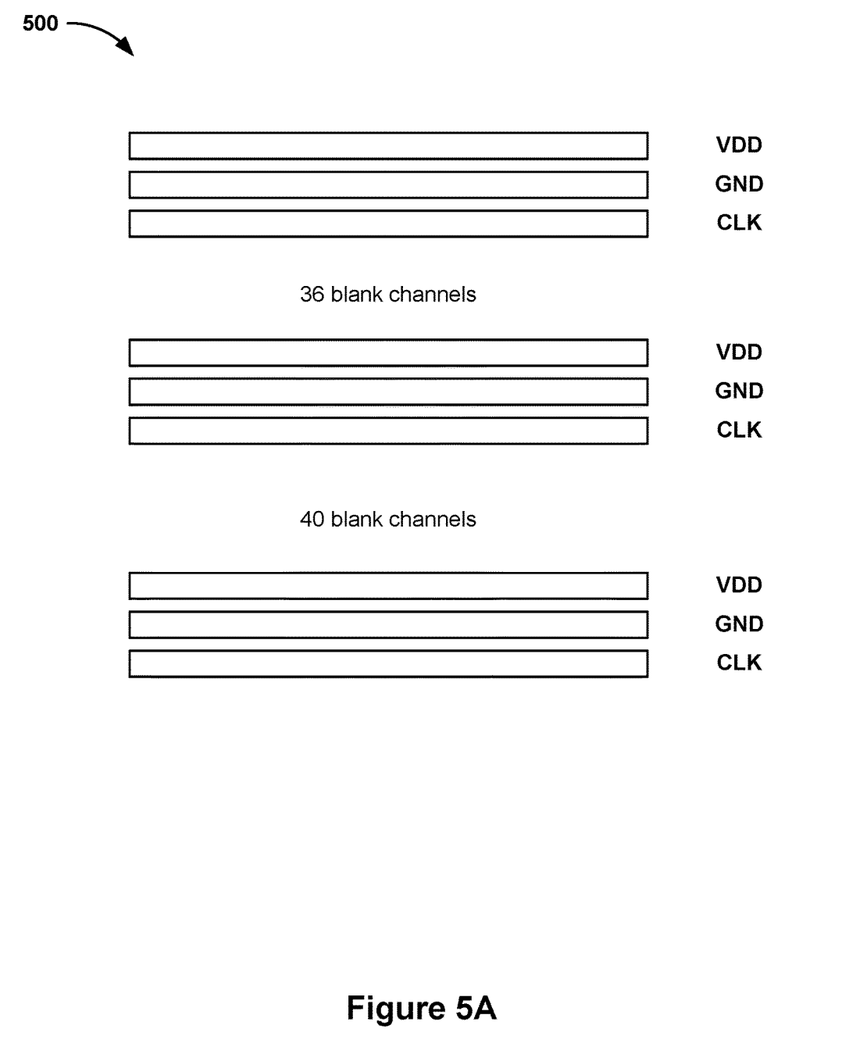
FIG. 5A and FIG. 5B show an exemplary wire arrangement according to an embodiment of the present invention.

Referring now to FIG. 5A, an exemplary wire layout 500 of an integrated circuit is shown. FIG. 5A shows a typical arrangement of wires without a coupling effect. In FIG. 5A VDD is a power source line, GND is a ground line, and CLK is a clock line. It is seen from FIG. 5A that VDDs, GNDs, and CLK are arranged in groups. VDDs, GNDs, and GLKs within one group are arranged on adjacent channels. A plurality of blank channels are reserved between different groups.

According to an embodiment of the present invention, when arranging the wires without a coupling effect, the wires without a coupling effect are arranged such that any of the wires without a coupling effect and at least a further wire without a coupling effect are arranged at two sides of a blank channel.

Figure 5B:
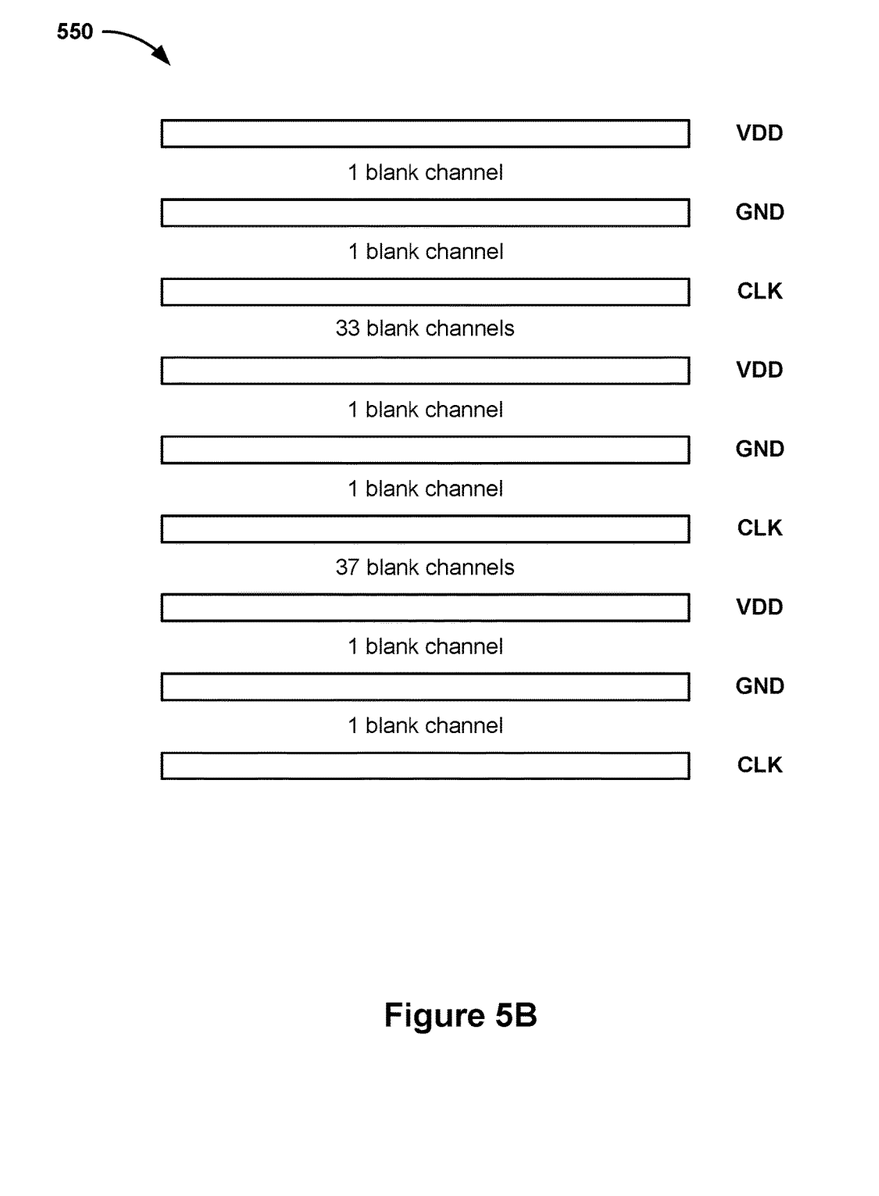

Referring now to FIG. 5B, an exemplary wire layout or arrangement 550 of an integrated circuit is shown. FIG. 5B shows an arrangement 550 of wires without a coupling effect, according to an embodiment of the present invention.

It is seen from FIG. 5B that a blank channel is reserved between VDD and GND and between GND and VDD, respectively. In this way, an unscreened wire may be arranged between two wires without a coupling effect. Such arranged unscreened wires will not generate coupling noise to other wires or suffer influence from coupling noise generated by other wires. Therefore, a plurality of wires with the largest total time influence factors will be further arranged in priority on channels between wires without a coupling effect, respectively.

In an embodiment shown in FIG. 4, for each wire in the target wires, its total time influence factor is calculated based on its time influence factors with respect to other wires. According to a further embodiment of the present invention, for each wire in the target wires, its total time influence factor may be calculated based on the time influence factors of other wires with respect to itself. The larger the total time influence factor calculated as such is, the more susceptibly the wire suffers from influences from other wires does, thereby generating an incremental delay. When the wires with larger total time influence factors are arranged on the channels adjacent to the wires without a coupling effect or even arranged on the channels between wires without a coupling effect according to steps 402 and 403, the coupling noise they suffer may be reduced.

Those skilled in the art would appreciate that for a certain target region, the number of unscreened wires is much larger than that of wires without a coupling effect. Therefore, only a part of the unscreened wires may be arranged on the channels adjacent to the wires without a coupling effect. For other unscreened wires, in deciding which channel is to be arranged, the effect on the already arranged wires from the unscreened wires, as well as the effect on the unscreened wires from the already arranged wires should be considered comprehensively. Those skilled in the art may appreciate that some weighted slack of timing check, etc., may also be applied.

Those skilled in the art would appreciate that the method according to an embodiment of the present invention may be used together with the method of arranging target wires according to the lengths of the wires in the prior art. For example, the time influence factors may be modified based on the lengths of the wires. For example, when the length of a wire is relatively long, the time influence factor of the wire may be increased; while the length of a wire is relatively short, the time influence factor of the wire is reduced. Then, respective wires are arranged in the target region based on the modified time influence factors.

According to an embodiment of the present invention, the time influence factors may be modified based on other factors. The factors include one or more of transmission quality of signal on a wire, load on a wire, drive capability of the drive gate driving the wire, etc.

Figure 6A:
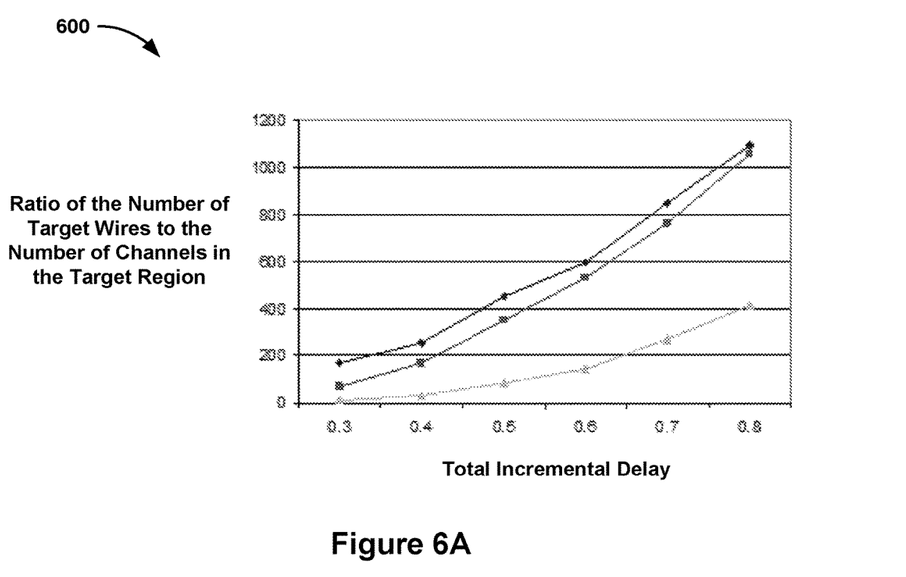
FIG. 6A and FIG. 6B show a comparison between the effect of the method according to an embodiment of the present invention and the effect of the prior art.
Figure 6B:
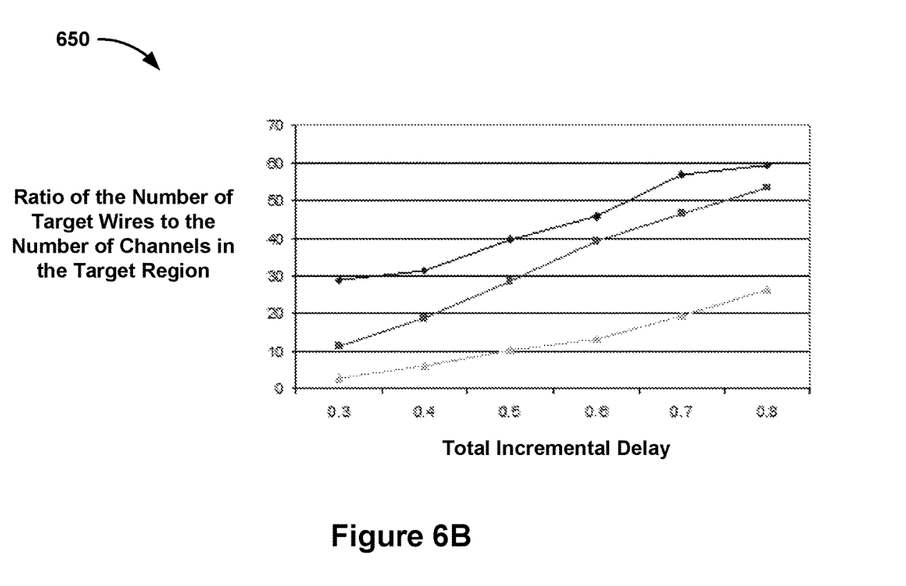

Referring now to FIGS. 6A and 6B, a graph 600 and a graph 650, respectively, are shown. FIGS. 6A and 6B show a comparison between the technical solution according to an embodiment of the present invention and the technical solution of the prior art in terms of noise performance enhancement. In FIG. 6A, a circuit derived from wiring according to various technical solutions is simulated, thereby obtaining a total cross-coupling capacitance of all wires in the circuits, i.e., a total incremental delay. In FIG. 6B, a circuit derived from wiring according to various technical solutions is simulated, thereby obtaining a worst cross-coupling capacitance of all wires in the circuit, i.e., the longest incremental delay. The longitudinal coordinates in FIGS. 6A and 6B represent incremental delay/cross-coupling capacitance, while the transverse coordinates represent a ratio of the number of target wires to the number of channels in the target region. In FIGS. 6A and 6B, triangular points correspond to the solution according to an embodiment of the present invention, square points correspond to a solution of wiring according to wire length in the prior art, while the rhombus points correspond to the solution of random wiring. It is seen from FIGS. 6A and 6B that the solution is improved in terms of noise performance enhancement according to a solution of an embodiment of the present invention. In particular, when the number of target wires approaches to the number of channels in the target region, the advantage of the method according to an embodiment of the present invention is more apparent.

The apparatus according to an embodiment of the present invention may be implemented through a computer program running on an exemplary computer system as shown in FIG. 1. Although FIG. 1 illustrates a hardware structure of a general computer system, since the computer system runs the computer program to implement the solution according to an embodiment of the present invention, the computer system/server is converted from a general computer system/server into the apparatus according to an embodiment of the present invention.

The apparatus according to an embodiment of the present invention, is generally implemented by a general computer system, and respective devices or modules composing the apparatus may be implemented by separate hardware. The general computer which runs the computer program may implement respective devices or modules in a time-division or processor core-division sharing manner. With the time-division implementation as an example, at a particular time, the general computer system may function as hardware specifically for implementing a particular device or module; at a different time, the general computer system may function as a different hardware specifically for implementing different devices or modules. The device according to an embodiment of the present invention is a combination of a series of apparatuses or modules implemented in hardware manner, not only a functional module architecture. The apparatus according to an embodiment of the present invention may be an entity apparatus mainly implementing the solution according to an embodiment of the present invention in a hardware manner.

Figure 7:
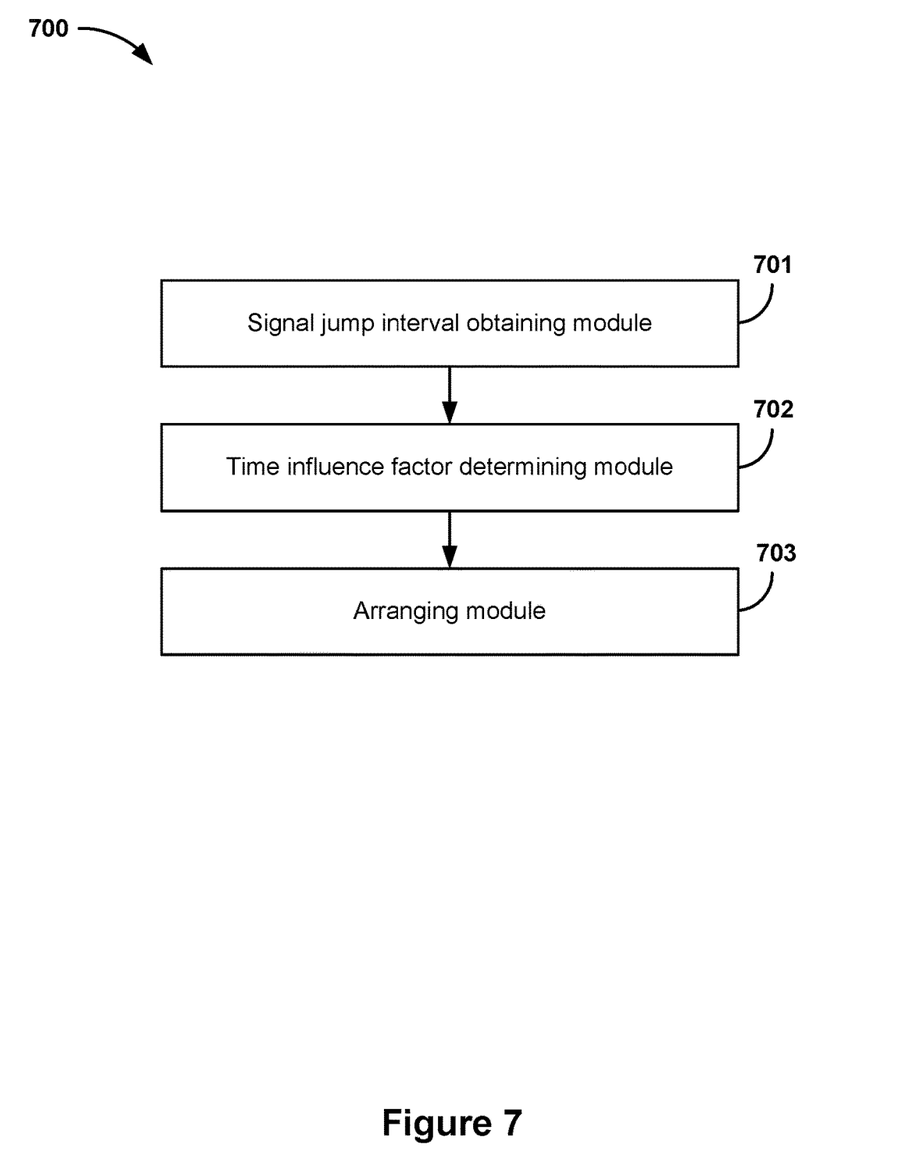
FIG. 7 shows a block diagram of an apparatus for enhancing integrated circuit noise performance according to an embodiment of the present invention.

Referring now to FIG. 7, an apparatus 700 is shown. The apparatus 700 may enhance integrated circuit noise performance, according to an embodiment of the present invention, for arranging target wires in a target region. The apparatus includes a signal jump interval obtaining module 701. The signal jump interval obtaining module 701 may be configured to, for each wire in the target wires, obtain its signal jump interval with respect to each of the other wires in the target wires, wherein the signal jump interval of one wire with respect to a further wire is a time interval between occurrence of signal jump on the one wire and occurrence of signal jump on the further wire. The apparatus 700 includes a time influence factor determining module 702. The time influence factor determining module 702 may be configured to calculate a corresponding time influence factor based on the signal jump interval, wherein the time influence factor is a decreasing function of the signal jump interval.

The apparatus 700 further includes an arranging module 703. The arranging module 703 may be configured to arrange the target wires in the target region based on the time influence factor. The arranging module 703 may include a total time influence factor calculating module configured to, for each wire in the target wires, calculate its total time influence factor based on its associated time influence factor. The arranging module 703 may further include a sorting module configured to sort the wires based on the total time influence factor. The arranging module 703 may further include a priority arrangement module configured to arrange the wires in the target region according to the sorting, wherein a wire with a larger total time influence factor is arranged in priority. The arranging module 703 may further include a non-coupling-effect wire arrangement module configured to arrange a wire without a coupling effect in the target region. The priority arrangement module may include a module configured to arrange in priority a wire with a larger total time influence factor on a channel adjacent to a wire without a coupling effect.

The non-coupling-effect wire arrangement module may include a module configured to arrange wires without a coupling effect as such that any wire without a coupling effect and at least another wire without a coupling effect are arranged at two sides of a blank channel; where the module configured to arrange, in priority, a wire with a larger total time influence factor on a channel adjacent to a wire without a coupling effect comprises: a module configured to arrange in priority wires with larger total time influence factors on channels between wires without a coupling effect, respectively.

The arranging module 703 includes: a module configured to modify the time influence factor based on wire length, thereby obtaining a modified time influence factor; and a module configured to arrange the target wires in the target region based on the modified time influence factor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In an embodiment, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to an embodiment of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of an embodiment, the practical application or technical improvement over technologies found in the marketplace, or to enable others of ordinary skill in the art to understand an embodiment disclosed herein.

What is claimed is:

1. A method comprising:
   obtaining a signal jump interval between each wire in a set of target wires, wherein the signal jump interval of one wire in the set of target wires with respect to another wire in the set of target wires is equal to a time interval between an occurrence of a signal jump on the one wire and an occurrence of a signal jump on the other wire;
   calculating a corresponding time influence factor based on the signal jump interval, wherein the time influence factor is a decreasing function of the signal jump interval;
   for each wire in the set of target wires, calculating a total time influence factor based on a sum of its signal jump intervals with each wire in the set of target wires;
   sorting the set of wires based on the total time influence factor;
   arranging the set of wires in the target region according to the sorting, wherein a wire with a larger total time influence factor is arranged in priority;
   providing a circuit derived from the arranged set of target wires; and
   fabricating a hardware device of the derived circuit.

2. The method according to claim 1, further comprising:
   arranging a wire without a coupling effect in the target region.

3. The method according to claim 2, wherein arranging the wire without a coupling effect in the target region comprises:
   arranging wires without a coupling effect such that a first wire without a coupling effect and a second wire without a coupling effect are arranged at two sides of a blank channel.

4. The method according to claim 1, wherein arranging the set of target wires comprises:
   arranging, in priority, a wire with a larger total time influence factor on a channel adjacent to a wire without a coupling effect.

5. The method according to claim 4, wherein arranging, in priority, a wire with a larger total time influence factor on the channel adjacent to the wire without a coupling effect comprises:
   arranging, in priority, wires with larger total time influence factors on channels between wires without a coupling effect, respectively.

6. The method according to claim 1, wherein arranging the set of target wires in the target region based on the time influence factor comprises:
   modifying the time influence factor based on wire length, thereby obtaining a modified time influence factor; and
   arranging the set of target wires in the target region based on the modified time influence factor.

7. The method according to claim 1, wherein the set of target wires comprise a plurality of wires designated to a specific target region on an integrated circuit design.

8. The method according to claim 1, wherein the set of target wires are unscreened signal lines.

9. A computer system comprising:
   one or more computer processors, one or more computer-readable storage media, and program instructions stored on one or more of the one or more computer-readable storage media for execution by at least one of the one or more computer processors, the program instructions comprising:
   program instructions to obtain a signal jump interval between each wire in a set of target wires, wherein the signal jump interval of one wire in the set of target wires with respect to another wire in the set of target wires is equal to a time interval between an occurrence of a signal jump on the one wire and an occurrence of a signal jump on the other wire;
   program instructions to calculate a corresponding time influence factor based on the signal jump interval, wherein the time influence factor is a decreasing function of the signal jump interval;
   for each wire in the set of target wires, program instructions to calculate a total time influence factor based on a sum of its signal jump intervals with each wire in the set of target wires;
   program instructions to sort the set of wires based on the total time influence factor;
   program instructions to arrange the set of wires in the target region according to the sorting, wherein a wire with a larger total time influence factor is arranged in priority;
   program instructions to provide a circuit derived from the arranged set of target wires; and
   program instructions to fabricate a hardware device of the derived circuit.

10. The computer system according to claim 9, further comprising:
    program instructions to arrange a wire without a coupling effect in the target region.

11. The computer system according to claim 10, wherein program instructions to arrange the wire without a coupling effect in the target region comprises:
  program instructions to arrange wires without a coupling effect such that a first wire without a coupling effect and a second wire without a coupling effect are arranged at two sides of a blank channel.

12. The computer system according to claim 9, wherein program instructions to arrange the set of target wires comprises:
  program instructions to arrange, in priority, a wire with a larger total time influence factor on a channel adjacent to a wire without a coupling effect.

13. The computer system according to claim 12, wherein program instructions to arrange, in priority, a wire with a larger total time influence factor on the channel adjacent to the wire without a coupling effect comprises:
  program instructions to arrange, in priority, wires with larger total time influence factors on channels between wires without a coupling effect, respectively.

14. The computer system according to claim 9, wherein program instructions to arrange the set of target wires in the target region based on the time influence factor comprises:
  program instructions to modify the time influence factor based on wire length, thereby obtaining a modified time influence factor; and
  program instructions to arrange the set of target wires in the target region based on the modified time influence factor.

15. The computer system according to claim 9, wherein the set of target wires comprise a plurality of wires designated to a specific target region on an integrated circuit design.

16. The computer system according to claim 9, wherein the set of target wires are unscreened signal lines.

17. A computer program product, the computer program product comprising:
  one or more computer-readable storage media and program instructions stored on the one or more computer-readable storage media, the program instructions comprising:
  program instructions toto obtain a signal jump interval between each wire in a set of target wires, wherein the signal jump interval of one wire in the set of target wires with respect to another wire in the set of target wires is equal to a time interval between an occurrence of a signal jump on the one wire and an occurrence of a signal jump on the other wire;
  program instructions to calculate a corresponding time influence factor based on the signal jump interval, wherein the time influence factor is a decreasing function of the signal jump interval;
  for each wire in the set of target wires, program instructions to calculate a total time influence factor based on a sum of its signal jump intervals with each wire in the set of target wires;
  program instructions to sort the set of wires based on the total time influence factor;
  program instructions to arrange the set of wires in the target region according to the sorting, wherein a wire with a larger total time influence factor is arranged in priority;
  program instructions to provide a circuit derived from the arranged set of target wires; and
  program instructions to fabricate a hardware device of the derived circuit.

18. The computer program product according to claim 17, further comprising:
  program instructions to arrange a wire without a coupling effect in the target region.

* * * * *